No. 867,907. PATENTED OCT. 8, 1907.
C. O. BOND & C. C. TUTWILER.
MEANS FOR ASCERTAINING THE TEMPERATURE OF ILLUMINATING GAS IN MAINS.
APPLICATION FILED NOV. 21, 1906.
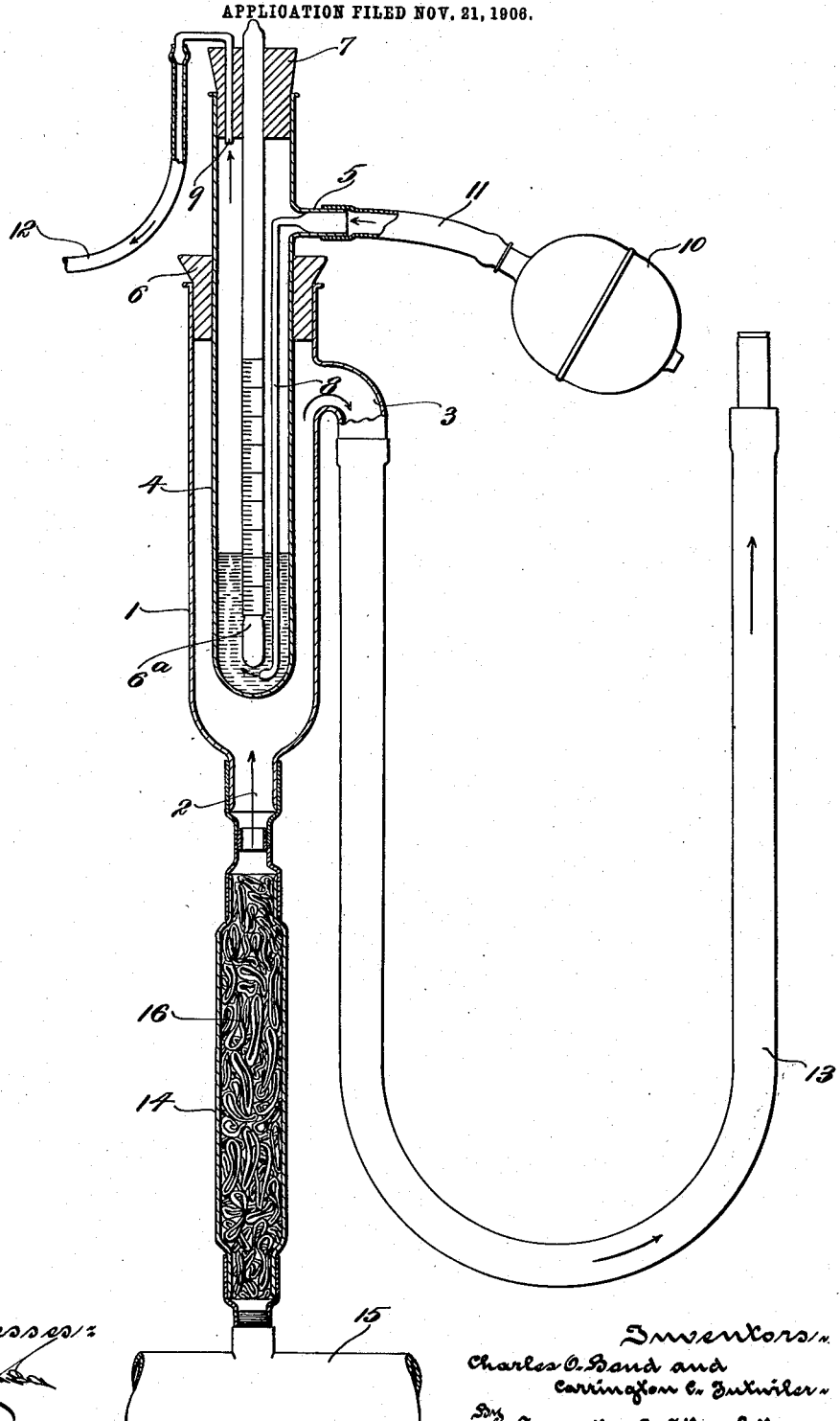

UNITED STATES PATENT OFFICE.

CHARLES O. BOND AND CARRINGTON C. TUTWILER, OF PHILADELPHIA, PENNSYLVANIA, ASSIGNORS TO THE UNITED GAS IMPROVEMENT COMPANY, OF PHILADELPHIA, PENNSYLVANIA, A CORPORATION OF PENNSYLVANIA.

MEANS FOR ASCERTAINING THE TEMPERATURE OF ILLUMINATING-GAS IN MAINS.

No. 867,907.     Specification of Letters Patent.     Patented Oct. 8, 1907.

Application filed November 21, 1906. Serial No. 344,405.

*To all whom it may concern:*

Be it known that we, CHARLES O. BOND and CARRINGTON C. TUTWILER, both citizens of the United States, residing at Philadelphia, in the county of Philadelphia and State of Pennsylvania, have jointly invented new and useful Means for Ascertaining the Temperature of Illuminating-Gas in Mains, of which the following is a specification.

It is often desirable to be able to ascertain the lowest temperature which illuminating gas has reached after leaving the works and prior to its delivery to the consumer; or, in other words, to ascertain the lowest temperature imparted to the gas by the mains or other conduits or apparatus through which it has passed and this temperature varies from time to time as with the seasons of the year. Those skilled in the art will understand the importance of this knowledge, but it may be stated that the effect of lowering the temperature of the gas is to deprive it of certain vapors among which are some that possess valuable illuminating properties, so that in order to insure full candle power gas at the points of consumption, it is not unusual to vary the composition of the gas at the works in accordance with the varying temperatures to which it will be subjected in its passage to the consumer.

The principal object of the present invention is to provide a direct reading hygrometer for the determination of the minimum temperatures attained by the gas in its passage from the source of supply to the consumers, and to this and other ends hereinafter set forth the invention comprises the hygrometer to be presently described and finally claimed.

The nature and characteristic features of the invention will be more fully understood from the following description taken in connection with the accompanying drawing in which there is illustrated principally in vertical section a hygrometer embodying features of the invention.

Before describing the structure of the hygrometer in connection with the drawings and explaining its mode of operation, the principle upon which it operates in connection with the ascertainment of the lowest temperature which the gas has reached in its passage through the mains will be set forth.

If the temperature of a gas saturated at a given temperature with water or other vapors is lowered appreciably below the point of saturation these vapors will begin to deposit out in liquid form, even though the gas may have been first raised to a higher temperature and provided that it is not allowed to come into contact with other vapors at the higher temperature. The point of deposition is called the "dew point". If gas taken from the mains is cooled down to the point at which it just commences to deposit water vapor, the temperature to which it is thus cooled will be the minimum temperature which it reached in the mains. This presupposes and it is usually the case that the water condensation lying in the holders and mains is covered with a film of oil which prevents the gas from picking up water vapor at a higher temperature. The effect of vapors of hydrocarbons picked up by the gas must be considered, as they too will deposit dew which cannot be distinguished from water dew by the naked eye. It may therefore be necessary to remove some of the unfixed vapors, including those hydrocarbon vapors which may have thus been picked up by the gas.

In the drawings 1, is a tube, as of glass, contracted or narrowing at its bottom to form a gas intake 2, and provided with a lateral opening or tubular extension 3, forming a gas off-take. Passing into the top of this external or gas tube 1, and extending towards the bottom thereof is a tube 4, having a closed lower end and provided with a lateral branch or opening 5.

6, is a stopper closing the top of the tube 1, and through which passes the tube 4. Within the inner or cooling tube 4, is arranged a thermometer $6^a$, which is supported by a stopper 7, that closes the upper end of the tube 4.

8, is a duct or tube leading from the opening 5, and discharging near the bottom of the tube 4, and the bulb of the thermometer.

9, is an outlet from the interior of the tube 4, and it is shown to comprise an open ended tube extending through the stopper 7.

10, is a bulb or the like, connected with the tube 5, by a rubber hose 11, and adapted to supply air through the tube or duct 8, and discharge it within the tube 4.

12, is an offtake connection from the tube 4.

13, is a tube connected with the gas offtake.

14, is a chamber interposed between the gas intake 2, and the source 15, from which the gas to be examined is drawn.

16, is material contained in the chamber 14, and adapted to free the gas from interfering vapors which it may have picked up and to which reference has already been made. An example of such material is subdivided rubber.

In using the apparatus for testing, gas is passed at the rate of about five feet per hour into and through the gas chamber formed within the external tube 1, for example, by way of the connections 14 and 13. The cooling chamber formed within the inner tube 4, is filled about quarter full of pentane, ether, or the like, and air is forced through this as by means of the rubber bulb 10 and connections 11, 9 and 12. Thus the pentane or ether is rapidly vaporized and lowers the temperature of the closed end of the test tube to the degree indicated by the thermometer 6ª. As soon as a temperature is reached which corresponds to the dew point, moisture will appear on the outside of the inner tube 4, and may be clearly seen by holding the instrument up to the light. The reading of the thermometer at this time represents the minimum temperature reached by the gas, provided it has not resaturated itself with hydrocarbon vapors at a higher temperature and as stated this may be guarded against by removing the interfering vapors by some such means as are indicated at 14.

What we claim is:

1. A direct reading hygrometer for the determination of minimum temperatures in gas mains and the like comprising means for establishing a flow of gas from the mains and for excluding the flowing gas from the air and cooling the same and exhibiting moisture of condensation therefrom, and a thermometer exposed to the cooling means for indicating the temperature of said devices, substantially as described.

2. A direct reading hygrometer for the determination of minimum temperatures in gas mains and the like comprising means for establishing a flow of gas from the mains and for excluding the flowing gas from the air and cooling the same and exhibiting moisture of condensation therefrom, a thermometer exposed to the cooling means for indicating the temperature of said devices, and apparatus for removing unfixed vapors from the gas prior to its cooling, substantially as described.

3. A hygrometer comprising the combination of a gas chamber having a gas inlet and outlet, a cooling chamber arranged in the gas chamber and provided with cooling means and upon which condensation is exhibited and a thermometer exposed to the cooling means for ascertaining the temperature at the cooling chamber, substantially as described.

4. A hygrometer comprising the combination of a gas chamber having a gas inlet and outlet, a cooling chamber arranged in the gas chamber and provided with cooling means and upon which condensation is exhibited, a thermometer exposed to the cooling means for ascertaining the temperature at the cooling chamber, and apparatus at the gas inlet for removing unfixed vapors from the gas, substantially as described.

5. A hygrometer comprising the combination of an external tube having a contracted end constituting a gas inlet and a lateral opening constituting a gas outlet, an internal tube arranged in the external tube and having a closed end, a stopper between said tubes, a stopper for the inner tube, a thermometer arranged in the inner tube and supported by its stopper, a duct leading into the inner tube and arranged to discharge near its closed end and near the thermometer, and an outlet from the inner tube, substantially as described.

In testimony whereof we have hereunto signed our names.

CHARLES O. BOND.
CARRINGTON C. TUTWILER.

Witnesses:
F. H. MAC MORRIS,
F. B. RANKIN.